US012258786B2

(12) United States Patent
Carr et al.

(10) Patent No.: US 12,258,786 B2
(45) Date of Patent: Mar. 25, 2025

(54) MAGNETIC PRIVACY LOCK CONTROL

(71) Applicants: Cameron Neil Carr, Santa Barbara, CA (US); Andrew Martin Vonnegut, Santa Barbara, CA (US)

(72) Inventors: Cameron Neil Carr, Santa Barbara, CA (US); Andrew Martin Vonnegut, Santa Barbara, CA (US)

( * ) Notice: Subject to any disclaimer, the term of this patent is extended or adjusted under 35 U.S.C. 154(b) by 0 days.

(21) Appl. No.: 16/998,351

(22) Filed: Aug. 20, 2020

(65) Prior Publication Data

US 2022/0056733 A1 Feb. 24, 2022

(51) Int. Cl.
*E05B 47/00* (2006.01)
*E05B 63/08* (2006.01)
*E05B 65/00* (2006.01)
*E05B 65/08* (2006.01)

(52) U.S. Cl.
CPC .......... *E05B 47/00* (2013.01); *E05B 47/0038* (2013.01); *E05B 63/08* (2013.01); *E05B 65/0035* (2013.01); *E05B 65/08* (2013.01)

(58) Field of Classification Search
CPC ...... E05B 47/00; E05B 63/08; E05B 47/0038; E05B 47/004; E05B 47/0043; E05B 47/0045; E05B 63/10; E05B 65/0035; E05B 13/002; E05B 13/004; E05B 19/16; E05B 2047/0094; E05B 15/0073; E05B 47/0044; E05B 47/0006; Y10T 292/11; Y10T 70/7057; Y10T 70/7904
USPC .......................................... 292/251.5; 70/413
See application file for complete search history.

(56) References Cited

U.S. PATENT DOCUMENTS 2,370,800 A * 3/1945 Konikoff ................. E05B 47/00 70/276
3,003,802 A * 10/1961 Wilson .................... E05C 19/16 292/251.5
3,079,189 A * 2/1963 Russell ................... E05C 1/163 292/336.3
3,111,834 A * 11/1963 Felson ................ E05B 47/0044 70/276
3,128,112 A * 4/1964 Fryer ...................... E05C 1/163 292/169.18
3,516,701 A * 6/1970 Graham ................ E05C 19/163 292/144
3,570,287 A * 3/1971 Hallmann ........... E05B 47/0042 70/276

(Continued)

FOREIGN PATENT DOCUMENTS

CH 492107 A * 6/1970 ......... E05B 47/0044
EP 3266963 A1 * 1/2018 ........... E05B 47/004
WO WO-2009000008 A1 * 12/2008 ......... E05B 47/0038

*Primary Examiner* — Christine M Mills
*Assistant Examiner* — Noah Horowitz

(57) ABSTRACT

A method for unlocking and/or locking a privacy lockset from the exterior of the lockset or door and without the use of buttons, keys, or an object inserted into the lockset or door. The operator manipulates a magnetic object, such as a magnet or piece of ferrous metal, on the exterior of the door or lockset to cause an internal magnet attached to a rod to move the rod in and out of a collar, the far end of the rod in turn actuating the lock into a locked and/or unlocked position. Rotational, lateral, and/or thrust forces may be configured to actuate the lock. The invention may apply to rim locks, mortise locks, sliding door locks, cylinder locks, and non-keyed deadbolts.

10 Claims, 5 Drawing Sheets

(56) References Cited

U.S. PATENT DOCUMENTS 3,584,485 A * 6/1971 Peterson ............... E05B 47/004 292/144
3,605,459 A * 9/1971 Van Dalen .......... E05B 47/0038 292/144
3,773,370 A * 11/1973 Jerila ...................... E05C 1/163 292/169.21
3,782,147 A * 1/1974 Hallmann ........... E05B 47/0042 70/276
4,686,841 A * 8/1987 Prunbauer ........... E05B 47/0042 70/276
4,848,812 A * 7/1989 Slaughter .............. E05C 19/163 292/144
5,188,405 A * 2/1993 Maccaferri ............. E05B 63/18 292/210
5,485,733 A * 1/1996 Hoffman ................. E05B 65/46 70/276
7,234,739 B2 * 6/2007 Saitoh ................... E05C 19/163 292/251.5
8,397,546 B2 * 3/2013 Varney .................. E05B 47/004 70/276
8,726,704 B2 * 5/2014 White ..................... E05B 37/20 70/276
8,864,188 B2 * 10/2014 Redgrave ................ E05C 19/16 292/DIG. 10
8,938,998 B2 * 1/2015 Haber ..................... E05C 3/045 70/276
10,407,944 B2 * 9/2019 Ribbe ....................... E05B 9/02
11,428,027 B2 * 8/2022 Huang ................ E05B 47/0045
11,466,474 B2 * 10/2022 Ellefred .............. E05B 47/0047
11,530,554 B2 * 12/2022 Tubby ................. E05B 15/1607
11,680,425 B2 * 6/2023 Marsden ................ A47B 88/57 292/143
2009/0273194 A1 * 11/2009 Patterson .................. H01F 7/04 335/306
2016/0145925 A1 * 5/2016 Salice ....................... E05F 5/06 312/334.44
2017/0275934 A1 * 9/2017 Schartner ................ E05C 19/16
2017/0335604 A1 * 11/2017 Liang .................... E05C 19/165

* cited by examiner

MAGNETIC PRIVACY LOCK CONTROL

CROSS-REFERENCE TO RELATED APPLICATIONS

N/A

BACKGROUND OF THE INVENTION

1. Field of the Invention

The present invention relates to door locks and more specifically to the use of magnets in door lock mechanisms.

2. Description of Related Art

Door handle and lock mechanisms are some of the oldest mechanical objects in existence. Previously the purview of numerous small artisans they have become in the last century mass produced items subject to ongoing innovation. The subcategory of such mechanism covered here are privacy locksets and their lock release mechanisms.

Privacy locksets are non-keyed locks used in residential, hospitality, and commercial applications. The door lock is controlled by an operator on the interior side of the door and when locked indicates that those outside are not invited to enter. To emphasize, the main role of the lock in a privacy lockset is to signal intention to others that the operator who locked the door would prefer that others not enter. They are not designed to inhibit forced entry. Privacy locksets are used extensively in offices, bathrooms, bathroom stalls, closets, and bedrooms. In one variation they may be lockable from the inside only and released when the door is opened or closed from the inside. In another they may be lockable from the outside once the door is closed. They can then be unlocked either from the inside by opening the door or from the outside with a keyed or non-keyed mechanical release mechanism.

Privacy locksets are not considered secure, in that most building code require that they can be opened with minimal effort from the locked side. This is to guard against children inadvertently activating the lock and getting locked in the room, among other reasons. All privacy locks on the US market have some exposed orifice or trigger that can be used to open the lock from the exterior side in case of emergency. Some have a slot to insert a screwdriver or other flat object. Others have a hole to insert a thin rod or other similar object (often a coat hanger is used).

U.S. Pat. No. 3,079,189A (1963) describes the typical mechanism now in use, the insertion of a thin rod into the exterior handle to release the lock. U.S. Pat. Nos. 3,128,112A and 3,773,370A (1973) describe typical privacy lock operation and locking mechanisms, now common in the field. There are no examples of prior art with either a magnetic or a concealed release or locking mechanism.

However, there are three disadvantages of the prior art: (a) The presence of a slot or other orifice on the exterior door handle detracts from the aesthetics and limits the design possibilities of the exterior side of the lockset and the handle. The required holes can be unsightly and interrupt the design of the lockset. In addition, existing release mechanisms require a linear path from the orifice that receives the unlocking device to the internal release point in the door handle. This creates limits on the aesthetics and design freedom. (b) Existing mechanisms require a release key of a particular size and shape, as noted usually slotted or rod shaped. Wire coat hangers were traditionally straightened and used, but these are being replaced by plastic ones over time and are absent from many modern homes. It is easy to imagine a situation in which a modern home lacks the means to open a typical privacy lock, thereby negating one of its main features. (c) Existing privacy locks cannot normally be readily locked from the outside once the door is closed. Most locks will pop open if the lock is activated and then the door is closed. In some variations, the door may be locked from the inside and then closed to remain locked. However, these are prone to error and the accidental locking of the door when the intention was otherwise. A keyed entry may be used, but this lacks the convenience of being able to readily lock and unlock a door from the outside without a key. Recall that the locking of a privacy lock is to project intention to have the door locked, not an expectation that it cannot be unlocked or that it protects against forcible entry.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In one aspect of the invention, a magnetic privacy lock for a door is provided, comprising a shaft actuator magnet; a shaft; a collar, wherein the shaft is configured to be inserted into and through the collar; a first shaft magnet embedded through the shaft, wherein the first shaft magnet has a first polarity; a second shaft magnet embedded through the shaft, wherein the second shaft magnet has a second polarity, wherein the second polarity has an opposite polarity from the first polarity; and, during operation a magnetic object is configured to draw the shaft actuator magnet and the shaft towards the magnetic object when the magnetic object is placed in close proximity to the shaft actuator magnet, which is configured to activate a lock actuator cam trigger, wherein the lock actuator cam trigger is configured to secure or release the magnetic privacy lock.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a magnetic privacy lock control.

For the purpose of this disclosure, the word "a" is defined to mean "at least one."

Figure 1A:
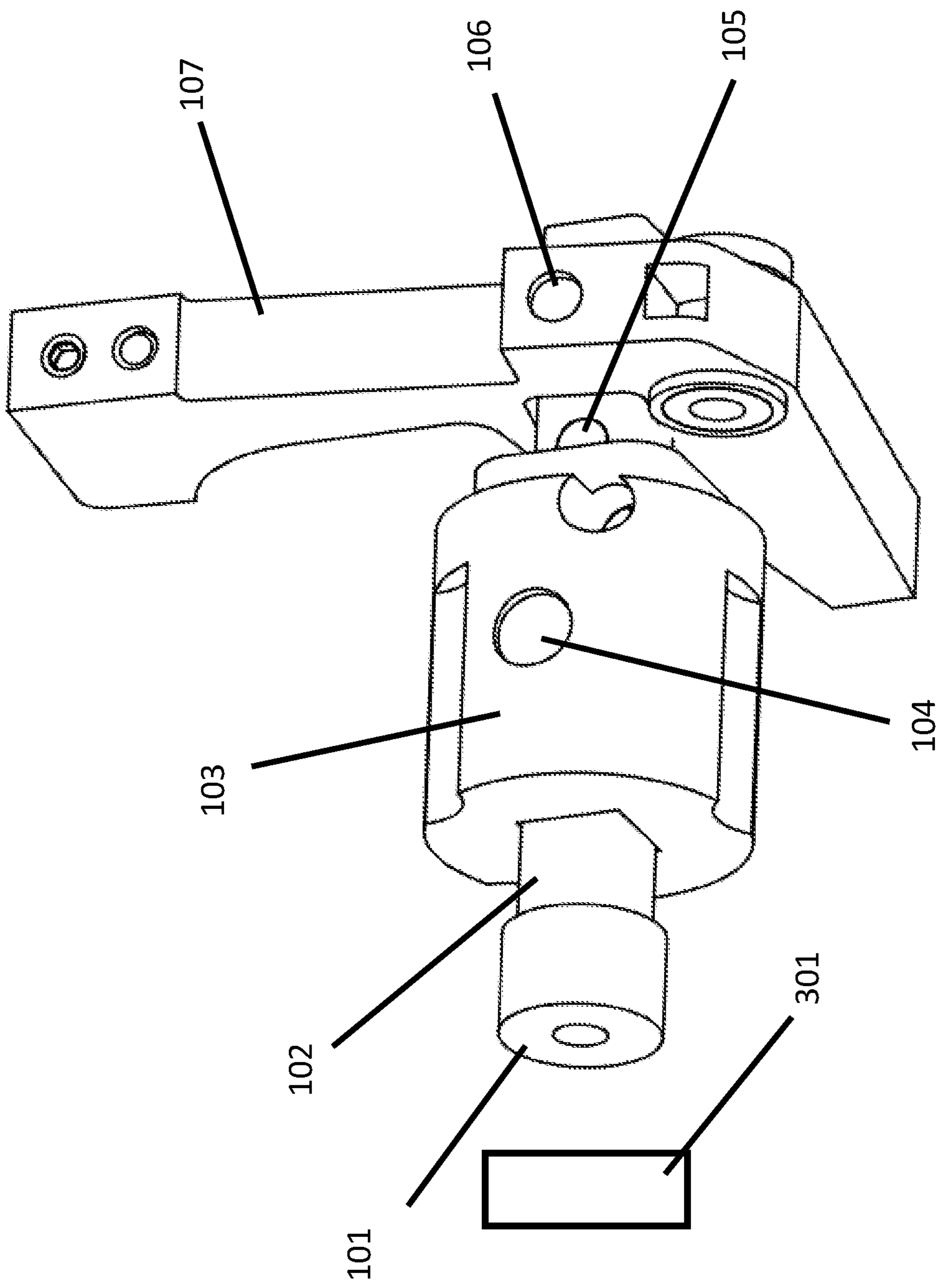
FIG. 1A is an isometric view of one embodiment illustrating the use of a magnetized plunger to actuate a lock release that itself has magnets embedded in it.

FIG. 1A is an isometric view of one embodiment illustrating the use of a magnetized plunger to actuate a lock release that itself has magnets embedded in it. The plunger in this embodiment creates a thrust force that then translates to lateral movement by the use of magnets.

In one embodiment, the shaft actuator magnet 101 is connected to the end of the plunger, actuator, arbor, or shaft 102. In another embodiment, the shaft actuator magnet 101 is formed as part of the end of the plunger, actuator, arbor, or shaft 102. In embodiments, where the shaft actuator magnet is connected to the plunger, actuator, arbor, or shaft, multiple means of connection methods may be used, including but not limited to magnets, threading, epoxy, or other means. The shaft 102 is inserted into and through the collar 103. The collar 103 is stabilized in some way, including by non-limiting examples of being embedded in the lock mechanism or the door. Tolerances between the shaft and collar are such to allow the shaft to move without friction other than loose surface to surface, i.e. not binding. In this embodiment, there are two incidences of collar magnets 104 each embedded in the collar 103. In some embodiments, a first shaft magnet 105 is embedded through the shaft 102. In some embodiments, the lock actuator magnet 106 is embedded in the lock actuator cam 107.

Figure 1B:
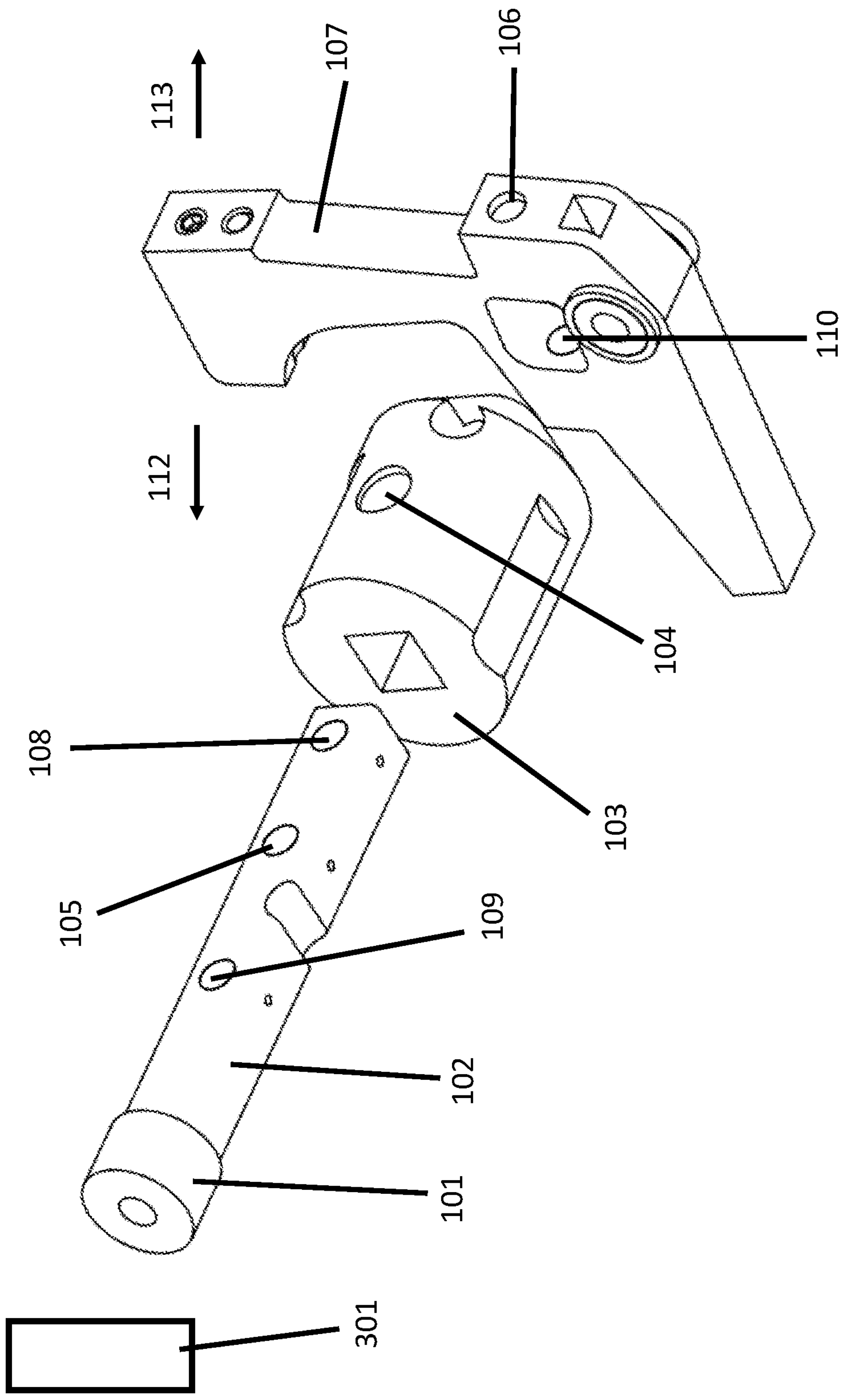
FIG. 1B is an exploded view of the embodiment illustrated in FIG. 1.

FIG. 1B is an exploded view of FIG. 1A and shows additional detail, in particular regarding magnet number, placement, and orientation. A second shaft magnet 108 is embedded through the shaft in an opposite polarity direction to the first shaft magnet 105. The magnets are located far enough from each other that the magnetic fields do not interfere in a significant way. There is one incidence of shaft neutral position magnet 109 that passes through shaft 102 in this embodiment, with magnet poles opposite to those of collar magnets 104. These are aligned to the collar magnets 104. A second actuator magnet 110 is embedded in the lock actuator cam 107 opposite actuator magnet 106 and with the same poles facing inward.

Figure 1C:
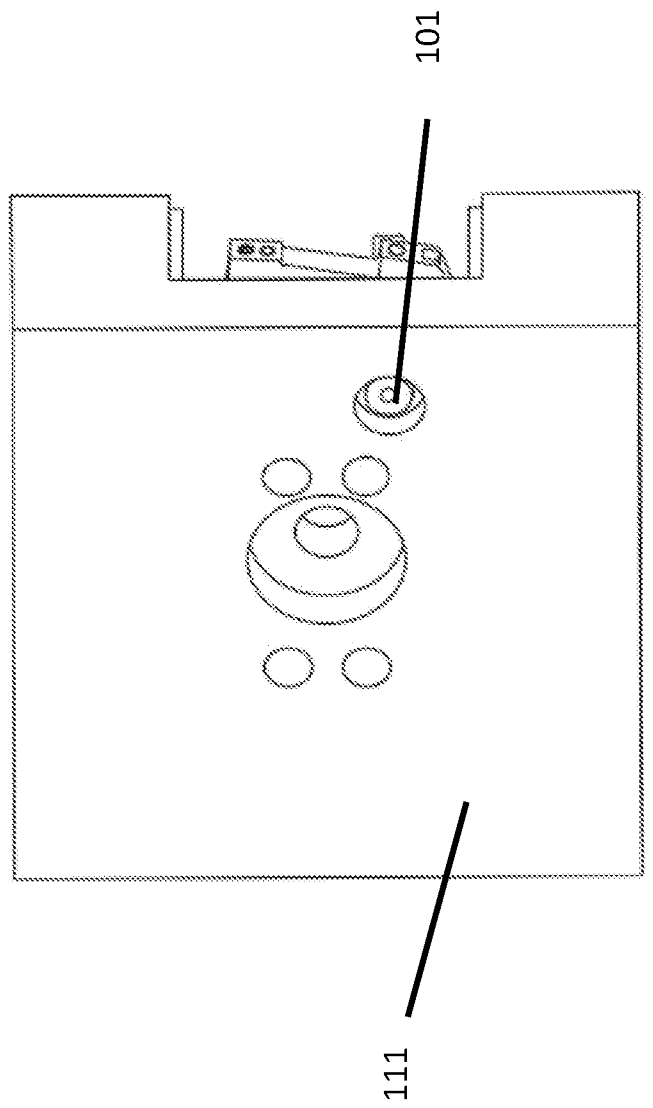
FIG. 1C shows the embodiment illustrated in FIG. 1 in one type of installation condition.

FIG. 1C shows an exemplary example of the apparatus positioned in a door 111. Note that the shaft actuator magnet 101 is located at or near the exterior of the door 111. Advantageously, this allows it to remain hidden from view with the magnetic field extending through a solid surface. The hole in the door 111 indicated in FIG. 1C is for illustrative purposes to show the shaft actuator magnet 101 below the surface of the door 111.

Figure 1D:
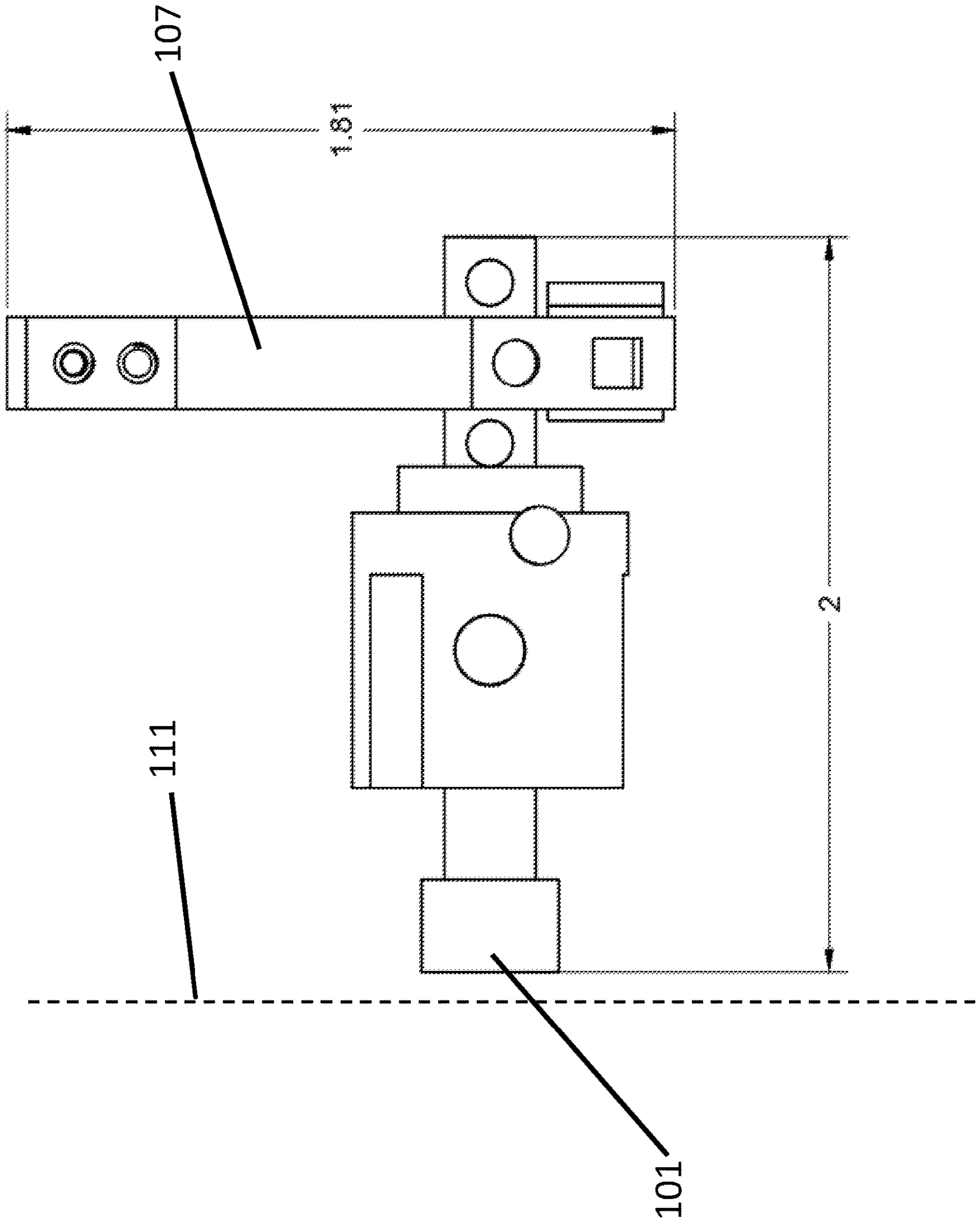
FIG. 1D is a dimensioned view of the embodiment illustrated in FIG. 1.

FIG. 1D shows reference dimensions for this embodiment. It should be understood, that the dimensions of this mechanism may vary and will depend on the degree of magnetic force needed to move the trigger on the lock. Larger and smaller magnets 101 may be used with larger and smaller gaps between the magnets and the face of the door 111, and with different variations of actuators 107, some of which may be magnetically actuated and some mechanically actuated.

The lock actuator, cam, trigger 107 in this embodiment is designed to lock and unlock one particular lock design. However, it can be any trigger that works to unlock and/or lock any lock mechanism.

During use, to unlock from the exterior face of door 111, a magnetic object 301 is placed on exterior face of door 111, sufficiently close to shaft actuator magnet 101 to draw the actuator magnet 101 and shaft 102 toward the magnetic object 301 and the exterior of the door. The strength of the magnetic field will vary depending on the size of shaft actuator magnet 101 and distance from exterior of door 111. A wide range of combinations will trigger the mechanism. For example, a stronger actuator magnet 101 or magnetic object 301 can move a larger or differently shaped actuator and can do so with a larger gap between the actuator magnet 101 and the face of the door 111.

Shaft 102 travels through the position stabilized collar 103 towards the magnetic object 301. The collar 103 ensures that the shaft 102 travels in a controlled manner. In this embodiment the shaft is configured to move in a thrust motion.

As shaft 102 is drawn towards outside face of door it is drawn through the orifice in lock actuator trigger 107. In the unlocking mode, the second shaft magnet 108 is drawn across lock trigger magnets 106 and 110. The negative pole of the second shaft magnet 108 is repelled by the negative pole of the second lock trigger magnet 110. The positive pole of second shaft magnet 108 is attracted by the negative pole of lock trigger magnet 106. This magnetic action draws lock trigger 107 in the unlocking direction shown by direction of movement of unlock arrow 112 in FIG. 1B.

This embodiment contains an option to use a magnetic object 301 to lock a closed door from the exterior when the magnetic object 301 is of opposite polarity to the magnet 101. Note that a magnetic object 301 that is only attractive can only be used to unlock the door in this embodiment. A magnetic object 301 that is only attractive could be used to lock a door with a realignment of magnets 105, 106, 108, and 110.

To lock, a magnetic object 301 of same polarity to shaft actuator magnet 101 is placed against exterior of door 111 in the vicinity of shaft actuator magnet 101. The same polarity magnets repel each other, causing a thrust motion opposite to the unlocking motion pushing the shaft 102 away from the surface of the door 111.

In the locking mode the first shaft magnet 105 is drawn across a first and second lock trigger magnets 106 and 110 respectively. The negative pole of the first shaft magnet 105 is repelled by the negative pole of the first lock trigger magnet 106. The positive pole of the first shaft magnet 105 is attracted by the negative pole of lock trigger magnet 110. This magnetic action draws lock trigger 107 in the locking direction shown by direction of movement of lock arrow 113 in FIG. 1B.

When not in locking or unlocking mode, the shaft 102 is returned to a neutral position by opposite attraction of collar magnets 104 and shaft neutral position magnets 109. There are two each of these to ensure balance and a return to neutral and retention in neutral position when mechanism is not being activated. In some embodiments, more magnets or fewer magnets of higher potential may also be used.

It should be understood, that lock trigger 107 may be any shape or configuration that is required to transfer magnet actuated motion to create a locked and unlocked position. Each lock will have a different way this happens. Thus in this embodiment, components 101 to 110 constitute a means for unlocking and/or locking a privacy lockset with a magnet from the exterior of the door.

Figure 2:
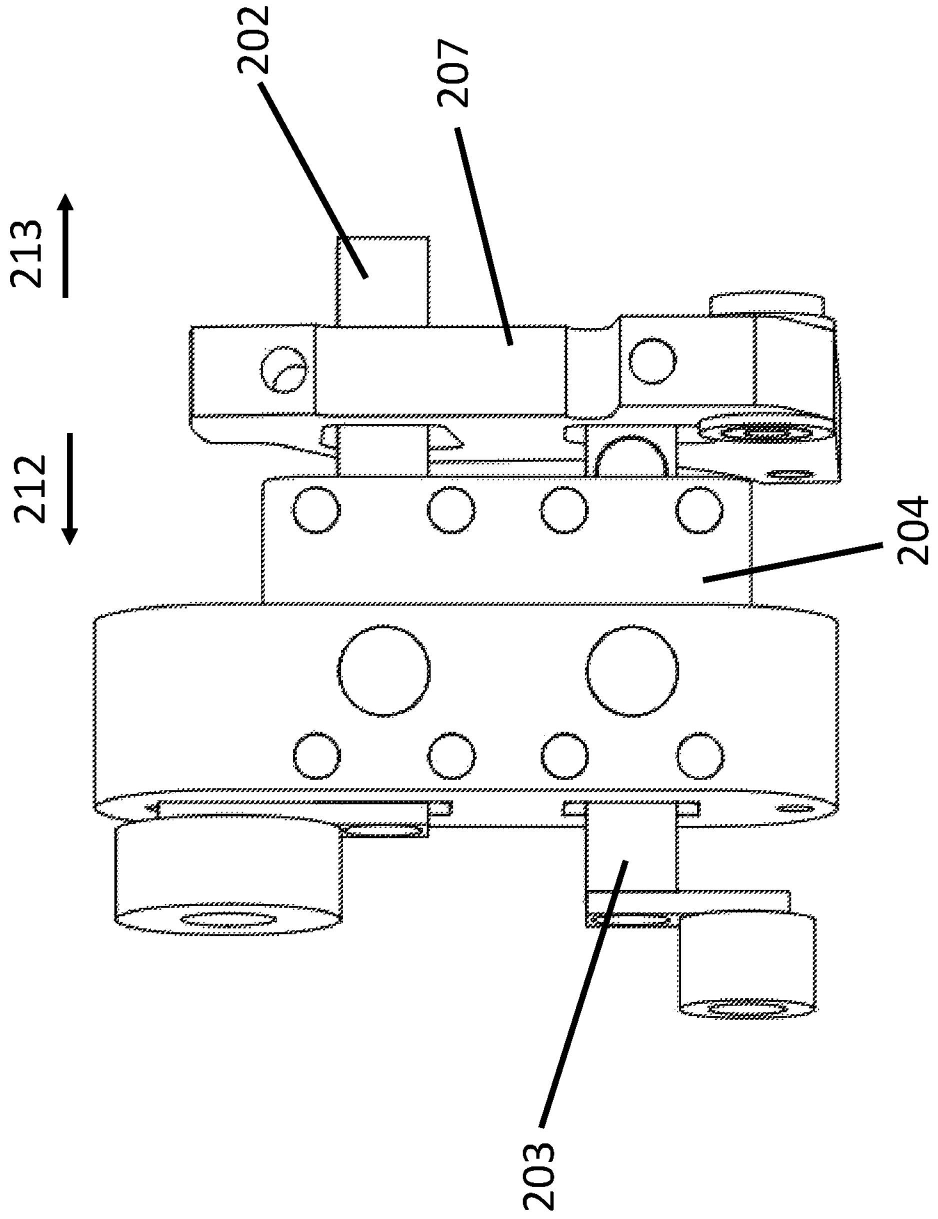
FIG. 2 is a second embodiment, illustrating an embodiment with two plungers, one to release the mechanism and one to lock the mechanism.

FIG. 2 depicts a view of one of many possible additional embodiments. In this case, all parts can be taken as identical to the embodiment previously described, except instead of shaft 102, there are two shafts 202 and 203 passing through a single position stabilized collar 204. Shaft 202 is for unlocking and shaft 203 is for locking. In this embodiment a magnetic object 301 can be used to both lock and unlock, or an attractive magnetic object 301 can be used for one action and a magnet for the other. In this case, shaft 202 moving along arrow direction 212 actuates the lock trigger 207 into the unlocked position and shaft 203 moving along arrow direction 213 actuates the lock trigger 207 into the locked position.

The end of shafts 202 and 203 can be magnets, wedges, or other means to magnetically or physically push lock trigger 207 as they move past or in and out of lock trigger 207.

It should be understood, that may other variations may be present without departing from the scope or spirit of the invention, for example: (a) Any type of mechanism that can transfer magnetically driven motion from one location and/or one plane to another can trigger a lock release and/or engagement. Types of motion can include rotational, lateral, and/or thrust forces; (b) This means can be used on different types of locksets including rim locks, mortise locks, cam locks, cylinder locks, and non-keyed deadbolts; (c) The locking mechanism and the lockset itself can be made from a range of materials as long as the magnetic fields are not interfered with. Components can be made from steel, bronze, stainless steel, 3D printed plastics, and a range of other materials. In some cases, ferrous materials can be used to direct and/or enhance magnetic fields; (d) The motion (along the X axis) actuated by the magnetic key can be transferred to longitudinal motion (along the perpendicular Y or Z axis) through any number of means to lock and unlock the privacy lock, including magnetic, wedge, mechanical, rack and pinion, and other means; (e) Shaft or other actuator can be brought back to the neutral position by use of a spring or other mechanical or gravitational means rather than the magnets illustrated in these embodiments; (f) The locking and unlocking mechanisms may be on a single apparatus or may be separate from each other, i.e. the locking action may be done from one actuator and the unlocking from another; and (g) In the embodiment noted, the actuator has a neutral position. In embodiments with a direct connection between the actuator and the locking and unlocking mechanism, no neutral may be required. It is simply noted in the embodiment shown as a convenience.

As discussed, the magnetic lock release of the present invention has several advantages over the prior art and current mechanisms in the marketplace. The examples above are only some potential embodiments of this new means of unlocking a privacy lockset from the outside. These examples given should not be construed as limitations to the scope, but examples of how it may be executed. Many others are possible, as previously indicated, for example: (a) Any type of mechanism that can transfer magnetically driven motion from one location and/or one plane to another can trigger a lock release. Types of motion can include rotational, lateral, and/or thrust forces; (b) This means can be used on different types of locksets including rim locks, sliding door locks, mortise locks, cam locks, cylinder locks, and non-keyed deadbolts; (c) The locking mechanism and the lockset itself can be made from a range of materials as long as the magnetic fields are not interfered with. Components can be made from steel, bronze, stainless steel, 3D printed plastics, and a range of other materials; (d) The motion (along the X axis) actuated by the magnetic key can be transferred to longitudinal motion (along the perpendicular Y or Z axis) through any number of means to lock and unlock the privacy lock, including magnetic, wedge, mechanical, rack and pinion and other means; (e) Shaft or other actuator can be brought back to the neutral position by use of a spring or other mechanical or gravitational means rather than the magnets illustrated in these embodiments; (f) The locking and unlocking mechanisms may be on a single apparatus or may be separate from each other, i.e. the locking action may be done from one actuator and the unlocking from another; (g) In the embodiment noted, the actuator has a neutral position. In embodiments with a direct connection between the actuator and the locking and unlocking mechanism, no neutral may be required. It is simply noted in the embodiment shown as a convenience.

It should be understood, that any component discussed herein may be comprised of a variety of materials, including but not limited to steel, stainless steel, bronze, aluminum, plastics, ceramics, and composites.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

REFERENCE LIST

101 shaft actuator magnet
102 shaft

103 collar
104 first collar magnets
105 first shaft magnet
106 first lock trigger magnet
107 lock actuator cam or trigger
108 second shaft magnet
109 shaft neutral position magnets
110 second lock trigger magnet
111 possible door install
112 direction of movement to unlock
113 direction of movement to lock
202 shaft for unlocking
203 shaft for locking
204 collar for dual shafts
207 lock actuator cam or trigger
212 first direction
213 second direction
301 magnetic object

What is claimed is:

1. A method for locking or unlocking a door privacy lock with a magnetic field and without an operator passing a key into any part of a lock mechanism or a door, comprising:

using a magnetic object to draw or push a shaft actuator magnet located at an end of a shaft;

the magnetic object causing the shaft to pass through a collar configured such that the shaft cannot rotate;

wherein the collar comprises collar magnets and the shaft further comprises shaft neutral position magnets of opposite polarity to the collar magnets, the shaft being retained in a starting position by attraction of said collar magnets and said shaft neutral position magnets prior to the magnetic object acting on the shaft actuator magnet;

moving said shaft through said collar, bringing a shaft magnet located on the opposite end of the shaft from the shaft actuator magnet into magnetic range of a lock trigger magnet of the same polarity as the shaft magnet, causing a lock actuator cam to move away from the the shaft magnet;

the lock actuator cam configured such that an end of the lock actuator cam is located a distance from the lock trigger magnet and the shaft magnet so that the end of the lock actuator cam moves a greater distance than the shaft trigger magnet moves from the shaft magnet;

withdrawing the magnetic object causing the collar magnets to attract the shaft neutral position magnets, drawing the shaft to the starting position;

the lock actuator cam remaining in the position located by the shaft magnet after withdrawal of the shaft magnet;

the shaft, the shaft actuator magnet, the collar, the collar magnets, the shaft magnet, the lock trigger magnet, and the lock actuator cam all being enclosed in the door or the lock mechanism;

wherein during operation manipulating the magnetic object moves the shaft actuator magnet, and moving of the shaft towards or away from the magnetic object causes a lock actuator cam to move, and wherein movement of the lock actuator cam is configured for securing or releasing the privacy lock.

2. The method of claim 1, wherein the shaft actuator magnet is connected to the end of the shaft.

3. The method of claim 1, wherein the shaft actuator magnet is formed integrally with the end of the shaft.

4. The method of claim 1, wherein the shaft actuator magnet is configured to be manipulated by the magnetic object from either side of the door.

5. The method of claim 1, wherein the lock actuator cam locks or unlocks privacy locks of the types consisting of: a rim lock, a cylinder lock, a mortise lock, a cam lock, a sliding door lock, and a non-keyed deadbolt lock.

6. An apparatus to lock or unlock a door privacy lock with a magnetic field and without an operator passing a key into any part of a lock mechanism or a door, comprising:

a magnetic object to draw or push a shaft actuator magnet located at a first end of a shaft;

a collar, wherein the shaft is configured to be inserted into and through the collar without rotation;

wherein the collar comprises collar magnets and the shaft further comprises shaft neutral position magnets of opposite polarity to the collar magnets, wherein said shaft is retained in a starting position by attraction of said collar magnets and said shaft neutral position magnets prior to application of the magnetic object, and wherein said shaft is returned to the starting position following removal of the magnetic object;

a shaft magnet located on the opposite end of the shaft from the shaft actuator magnet;

a lock actuator cam mounted and passed through by the shaft at an opposite end of the shaft containing the shaft magnet, and with the lock actuator cam containing a lock trigger magnet of the same polarity as the shaft magnet;

the lock actuator cam configured with an end of the lock actuator cam located a distance from the lock trigger magnet and the shaft magnet so that the end of the lock actuator cam moves a greater distance than the lock trigger magnet moves from the shaft magnet;

the shaft, the shaft actuator magnet, the collar, the collar magnets, the shaft magnet, the lock trigger magnet, and the lock actuator cam trigger all being enclosed in the door or the lock mechanism;

wherein during operation, the magnetic object is configured to manipulate the shaft actuator magnet and the shaft from the starting position towards or away from the magnetic object and through the collar, thereby causing the lock actuator cam to move, wherein the lock actuator cam is configured to secure or release the privacy lock;

wherein removal of the magnetic object returns the shaft to the starting position in the collar prior to manipulation by the magnetic object, and the lock actuator cam remains in a new position having secured or released the privacy lock.

7. The apparatus of claim 6, wherein the shaft actuator magnet connects to the end of the shaft.

8. The apparatus of claim 6, wherein the shaft actuator magnet is integrally formed with the end of the shaft.

9. The apparatus of claim 6, wherein the shaft actuator magnet is configured to be manipulated by the magnetic object from either side of the door.

10. The apparatus of claim 6, wherein the lock actuator cam locks or unlocks privacy locks of the types consisting of: a rim lock, a cylinder lock, a mortise lock, a cam lock, a sliding door lock, and a non-keyed deadbolt lock.

* * * * *